United States Patent
Torbitt et al.

(10) Patent No.: US 12,540,703 B2
(45) Date of Patent: Feb. 3, 2026

(54) CONNECTION ARRANGEMENT FOR CAMERAS

(71) Applicant: Videndum Plc, Richmond (GB)

(72) Inventors: Jolyon Torbitt, Bury St. Edmunds (GB); Simon Hall, Stowmarket (GB); Andrew Derek Murrow, Bury St. Edmunds (GB); James Guest, Thurston (GB); Alejandro Jiron, Richmond (GB); Danny Fonseca, Richmond (GB)

(73) Assignee: Vindendum Plc, Richmond (GB)

( * ) Notice: Subject to any disclaimer, the term of this patent is extended or adjusted under 35 U.S.C. 154(b) by 20 days.

(21) Appl. No.: 18/246,610

(22) PCT Filed: Sep. 30, 2021

(86) PCT No.: PCT/GB2021/052531
§ 371 (c)(1),
(2) Date: Mar. 24, 2023

(87) PCT Pub. No.: WO2022/069890
PCT Pub. Date: Apr. 7, 2022

(65) Prior Publication Data
US 2023/0366504 A1    Nov. 16, 2023

(30) Foreign Application Priority Data

Oct. 2, 2020 (GB) ...................................... 2015688
Oct. 6, 2020 (GB) ...................................... 2015830

(51) Int. Cl.
*F16M 11/04* (2006.01)
*F16B 2/06* (2006.01)
(Continued)

(52) U.S. Cl.
CPC ............. *F16M 11/041* (2013.01); *F16B 2/06* (2013.01); *G03B 17/12* (2013.01); *G03B 17/561* (2013.01)

(58) Field of Classification Search
CPC ........... F16M 11/041; F16M 2200/022; F16M 11/2014; F16M 11/2092; F16B 2/06; G03B 17/561; G03B 17/12
(Continued)

(56) References Cited

U.S. PATENT DOCUMENTS 2,375,690 A * 5/1945 Reeves ................. F16M 11/16
248/183.3
2,572,468 A * 10/1951 Gibson ................. F16M 11/14
248/181.2

(Continued)

FOREIGN PATENT DOCUMENTS

| EP | 1939518 A1 | 7/2008 |
| GB | 2582820 A | 10/2020 |
| WO | 2009/109828 A1 | 9/2009 |

OTHER PUBLICATIONS

International Search Report and Written Opinion for Corresponding International Application No. PCT/GB2021/052531, mailed Dec. 23, 2021, 9 pages.

(Continued)

*Primary Examiner* — Jason W San
*Assistant Examiner* — Rowland Do
(74) *Attorney, Agent, or Firm* — McCarter & English, LLP

(57) ABSTRACT

A releasable connection arrangement, suitable for releasably connecting two items, wherein a base portion includes a clamp stud and a head portion includes a stud catch mechanism, and wherein the clamp stud and stud catch mechanism are adapted to be connected to one another when the stud catch mechanism is in an engaged state and to be not (Continued)

connected to one another when the stud catch mechanism is in a disengaged state, the stud catch mechanism providing a substantially frictional connection between the stud catch mechanism and the stud catch when the stud catch mechanism is in the engaged state, the stud catch mechanism including a stud catch plate adapted to be moveable and a stud release lever adapted to move the stud catch plate axially towards and away from the clamp stud in use, so that the stud catch plate can engage and disengage the clamp stud in use.

4 Claims, 7 Drawing Sheets

(51) Int. Cl.
  *G03B 17/12* (2021.01)
  *G03B 17/56* (2021.01)
(58) Field of Classification Search
  USPC ......... 248/177.1, 178.1, 187.1; 396/419, 428
  See application file for complete search history.

(56) References Cited

U.S. PATENT DOCUMENTS

| | | |
|---|---|---|
| 3,870,264 A | 3/1975 | Robinson |
| 3,881,675 A | 5/1975 | Matchett |
| 4,579,436 A * | 4/1986 | Jaumann ................ F16M 11/16 396/419 |
| 6,007,259 A | 12/1999 | Akinari et al. |
| 2008/0156947 A1* | 7/2008 | Yamaguchi .......... G03B 17/561 248/177.1 |
| 2013/0134268 A1 | 5/2013 | Wessels et al. |
| 2022/0018492 A1* | 1/2022 | Murrow ............... F16M 11/126 |
| 2023/0408892 A1 | 12/2023 | Torbitt et al. |

OTHER PUBLICATIONS

International Search Report and Written Opinion for Application No. PCT/GB2021/052533, dated Dec. 23, 2021, 8 pages.

* cited by examiner

CONNECTION ARRANGEMENT FOR CAMERAS

CROSS-REFERENCE TO RELATED APPLICATIONS

The present application is a National Stage Entry of International Application No. PCT/GB2021/052531, filed Sep. 30, 2021, which claims priority to British Patent Application No. 2015688.1, filed Oct. 2, 2020, and British Patent Application No. 2015830.9, filed Oct. 6, 2020, the entire contents of which are included by reference herein.

FIELD OF THE INVENTION

The present inventive concept relates to a head assembly for a tripod. Tripods are often used to support cameras and the like.

BACKGROUND TO THE INVENTION

Tripods are widely used to support video cameras, and the camera is generally mounted onto a head which is in turn fixed onto the tripod. The head provides the articulation to enable the camera to be moved by the camera operator in pan and in tilt, and it generally also provides a means of counter-balancing the camera and applying variable drag to dampen the movements about each axis. The head generally also provides pan and tilt brakes to enable the camera to be locked in a particular position for safety and for fixed shots.

When the operator is panning the camera, they generally want the pan axis to be truly vertical: otherwise the camera will tend to rotate of its own accord towards the lowest point, and any panning shots will not follow a horizontal horizon. However, the top of the tripod is affected by the position, length and angle of each of the legs and is rarely horizontal. Instead its orientation tends to change every time the tripod is moved or adjusted. Although it is theoretically possible to adjust the tripod so that its top is horizontal, in practice this is very difficult to achieve particularly when there is a heavy camera and head mounted on top.

As a result it is common practice to add a separate levelling means between the tripod and the head, so that the tripod may be adjusted for height and security and then the head adjusted separately to be level. When the head is level then the pan axis is vertical. The most common means of providing this levelling means is through the use of a bowl clamp as the interface between the head and the tripod. The head is generally provided with a level bubble to indicate when it is level.

A bowl clamp generally comprises four parts: a part at the very bottom of the head with a substantially hemispherical outer surface and a stud which protrudes in a downward direction; a bowl-like part at the top of the tripod in the form of a hemispherical shell slightly larger in inside radius than the bottom of the head; a ring at the top of the hemispherical shell which has the same inner radius as the outer radius of the bottom of the head; and a clamping nut which screws onto the stud in the bottom of the head and with a part-spherical washer that bears on the outer surface of the hemispherical shell. In use the head rests on the ring at the top of the bowl on the top of the tripod with the stud at the bottom of the head passing through an aperture in the bottom of bowl; the clamping nut is then screwed onto the protruding stud from underneath the bowl. Whilst the nut is loose, the head can be moved relative to the ring that its bottom part is resting on to level it. If the clamping nut is tightened then its washer bears on the bottom of the bowl shell to draw the head down onto the ring, and the friction between the head and the ring and the washer and the bottom of the bowl lock the head in position. A user can therefore level the head by loosening the clamping nut, repositioning the head and then re-tightening the nut.

An example of this arrangement can be seen in GB2535682A, FIG. 2; it can also be seen in cross-section with a lever operated clamp in EP2787270, FIG. 5.

The bowl clamp arrangement has proven simple and robust but does suffer from some drawbacks in use. It relies on the screwing and unscrewing of the clamp nut which is situated underneath the top of the tripod. There is limited space in this area, particularly when the legs are deployed in near-vertical positions, and the operator can have difficulty operating the clamp or even suffer bruised knuckles. It also takes a significant time to unscrew the clamp and then re-screw it once the head is levelled, which can make it difficult when there is a heavy camera on the head as this must be balanced by the operator until the clamp is secured. To operate the clamp, the user must reach under the top of the tripod whilst observing the level bubble on the top of the head and balancing the camera on top of the head. This can be awkward, particularly when a heavy camera is being used. Finally, to remove the head from the tripod the clamp nut must be fully unscrewed which can take significant time. Once separate from the tripod, the head has to then be laid on its side as the protruding stud on its bottom prevents it from being stood up on a flat surface, and this can cause damage to the head and also the camera if it remains mounted to the head.

EP2787270 describes a bowl clamp mechanism that addresses some of these issues. Rather than use a clamp nut that must be screwed and unscrewed to operate, this device uses a clamp which is operated by a lever. This makes it easier to operate in the confines of the space under the top of the tripod and makes clamping and un-clamping much quicker to achieve, but the operator must still reach under the top of the tripod between the legs to operate the clamp. The clamp is still screwed onto a stud protruding from the bottom of the head, which means that removing the entire head still takes a significant time and the head will not then stand upright on a level surface because of the stud.

Our co-pending patent application, with international patent application number PCT/GB2020/050649 (subsequently published as WO/2020/201695) describes a head assembly for a tripod comprising a head portion and a bowl portion releasably connectable to one another, the bowl portion having a clamp stud and the head portion having a stud catch mechanism, wherein the stud catch mechanism is adapted to be releasably connectable to the clamp stud, and wherein the head assembly further comprises an adjustment mechanism adapted to adjust the connection between the head portion and the bowl portion when the head portion and bowl portion are connected to one another.

SUMMARY OF THE INVENTION

The present inventive concept provides a releasable connection arrangement, suitable for releasably connecting two items, wherein a base portion comprises a clamp stud and a head portion comprises a stud catch mechanism, and wherein the clamp stud and stud catch mechanism are adapted to be connected to one another when the stud catch mechanism is in an engaged state and to be not connected to one another when the stud catch mechanism is in a disengaged state, the stud catch mechanism providing a substantially frictional connection between the stud catch mechanism and the stud catch when the stud catch mechanism is in the engaged state, the stud catch mechanism comprising a stud catch plate adapted to be moveable axially and a stud release lever adapted to move the stud catch plate axially towards and away from the clamp stud in use, so that the stud catch plate can engage and disengage the clamp stud in use, and wherein the base portion and head portion each further comprise engagement surfaces shaped to correspond with one another, the engagement surface of the base portion comprising a substantially flat region and a concave region and the engagement surface of the head portion comprising a substantially flat region and a convex region, and wherein the head portion further comprises an adjustment mechanism adapted to adjust the connection between the head portion and the base portion when the base and head portions are connected to one another, and wherein the head portion further comprises a platform assembly located away from the engagement surface, the platform assembly comprising means for attaching to another item.

The said frictional connection differentiates the stud catch mechanism from previously-known screw-thread arrangements as discussed above.

The head portion may have a central axis, which in use may be substantially vertical. In use the head portion may be arranged substantially vertically above the base portion—although the skilled reader will appreciate that not every element of the head portion need be above every element of the base portion. References to the central axis and relative positions such as up, down, above and below will be understood by the reader in this context.

The engagement surface of the head portion forms a bowl-type shape with a flat base and the engagement surface of the base portion thus forms a corresponding bowl-type shape with a flat base. The head portion thus fits onto the base portion from above. In this context, the platform assembly would be arranged above the engagement surface of the head portion. Preferably, the platform assembly is arranged substantially at the top of the head portion, in use. Thus a further item can be attached to the top of the head portion via the platform assembly.

In use the base portion may be attached to an item such as a camera or camera accessory. The head portion may be attached to an item such as a camera or camera accessory via the platform assembly. Thus the present arrangement may be used to releasably connect a camera with an accessory, or two accessories. The present arrangement may be daisy chained to connect several items together. For example, the platform assembly may be provided with a further base portion, so that a further head portion can be connected thereto, and so on.

The base portion may have an aperture arranged in its underside, the aperture comprising a screw-thread adapted to match a corresponding screw-threaded bolt. Such a bolt may be an industry standard bolt found on accessories.

The platform assembly may be provided with a slot adapted to accept and engage with a camera plate. Camera plates are available in industry standardised forms, so that a variety of cameras and accessories can be attached thereto. Such camera plates can be provided with an industry standard bolt. The above-mentioned aperture of the base portion may thus be adapted to match a bolt of a camera plate.

An envisaged item to be used with the present inventive concept is a slider adapter.

The clamp stud may comprise a recess. The stud catch mechanism of the head portion may comprise a stud catch plate moveable substantially horizontally into and out of the recess of the clamp stud. The stud catch plate may be engageable by a release lever. Thus, the release lever may be actuated to move the stud catch plate into and out of the recess of the clamp stud to connect and release, respectively, the stud catch plate from the clamp stud.

The stud catch plate may alternatively be moveable by other means such as directly by a user, or via a push button or the like.

The base portion may further comprise a wedge collar substantially around its perimeter at a lower part of the clamp stud. The clamp stud may have a first region of reduced diameter at a lower part thereof, to form an engagement portion with an upper edge of the wedge collar. The base portion may further comprise an annular recess in the flat region thereof. The base portion may further comprise an annular wave spring arranged within the said annular recess in the flat region. The clamp stud may have a second region of reduced diameter, below the first region of reduced diameter, the second region having a smaller diameter than the first region. The regions of reduced diameter, wave spring and wedge collar form an arrangement adapted to urge the base portion and the head portion more securely together, when in the engaged state.

Thus, the head portion can be released or connected to the base portion. The release lever may be pivotable about a point of the head portion.

The adjustment mechanism may have a levelling mode and a fixed mode. When the adjustment mechanism is in the levelling mode, the connection between the head portion and the bowl portion can be adjusted. When the adjustment mechanism is in the fixed mode, the connection between the head portion and the bowl portion substantially cannot be adjusted.

When the adjustment mechanism is in the levelling mode, some relative movement between the head portion and the bowl portion is allowed—while the head portion and bowl portion are connected to one another-so that a user can make small adjustments to the position and/or angle of the head portion relative to the bowl portion. This enables the head portion to be levelled. In the fixed mode, substantially no adjustments are possible.

The head portion may comprise a lower portion, a spring and a spring compression plate. The spring may be adapted to urge the lower portion and the spring compression plate away from each other vertically. In other words the spring compression plate may be urged upwards by the spring away from the lower portion of the head portion.

When the head portion and base portion are connected together, with the stud catch plate connected to the clamp stud, an upwardly facing surface of the stud catch plate engages with a downwardly facing surface of the clamp stud, and a downwardly facing surface of the stud catch plate engages with an upwardly facing surface of the spring compression plate. Thus, the spring urges the clamp stud of the bowl portion upwards to bring the head portion and clamp cup closer together.

The spring compression plate may be provided with one or more slots; within which a stud catch plate can move.

Alternatively, the spring compression plate may be adapted to provide a vertical interaction, so that the spring can urge the stud catch plate upwards.

It is also desirable to have at least one region of precise correspondence between a lower surface of the lower portion of the head portion (sometimes referred to as a half bowl) and an upper surface of the base portion. Thus, preferably the upper surface of the base portion has at least an annular portion angled and contoured to substantially precisely correspond to a convex portion of the lower surface of the lower portion of the head portion.

The head portion may further comprise a lead screw arranged substantially vertically along the central axis and above the spring compression plate, a downwardly facing surface of the lead screw being adapted to engage an upwardly facing surface of the spring compression plate. A rotation of the lead screw may thus be transferred to the spring compression plate to urge it downwards. Thus, an upward urging of the spring compression plate by the spring can be mitigated by a downward urging by the lead screw.

The spring may be a disk spring.

In the levelling mode the connection between the head portion and the base portion is relaxed, by urging of the lead screw downwards. Such a relaxation allows adjustment so the head portion can be levelled when the lead screw has a suitable rotational force exerted thereon.

In other words, the said mitigation may allow a small degree of movement between the head portion and the bowl portion.

The said fixed mode may be engaged by an opposite rotational force exerted on the lead screw.

The lead screw may engage towards an upper end thereof with a handle. Rotation of the handle may thus exert a rotational force on the lead screw or to engage or disengage the said fixed mode. The handle is preferably arranged to rotate in a horizontal plane (i.e. about a vertical axis). Such horizontal rotation prevents the handle from interfering with a connection with an accessory above the head portion.

Thus, a user can select a levelling mode by moving the handle.

The adjustment mechanism may alternatively be actuated by any one of a suitable button, lever, knob or rotary means.

In some envisaged embodiments, the handle and the release lever are the same component. Thus a user can engage and disengage the base portion and the head portion, and also select a levelling mode, by actuating the same handle.

The base of the head portion preferably includes a substantially flat region substantially at a lower end thereof. This enables the head portion, when detached from the bowl portion, to be placed on a flat or approximately flat surface without risking toppling or rolling etc.

The top of the clamp stud may be bevelled. The bottom of the stud catch plate may correspondingly be bevelled. Thus, if the head portion is pushed down onto the clamp stud the stud catch plate may automatically be moved outward and then inward again (for example being urged) so that the stud catch plate may engage in a recess of the clamp stud.

DETAILED DESCRIPTION OF AN EXEMPLARY EMBODIMENT

Exemplary embodiments of constituent parts of the present inventive concept will now be described in reference to the accompanying drawings, in which.

The drawings focus on certain components of the inventive concept. In some drawings not every component is explicitly labelled and/or referred to in the accompanying description. Labelling has been minimised to aid clarity and an absence of a label in a particular drawing should not be taken to imply that a particular component shown or described elsewhere is not present.

Figure 1:
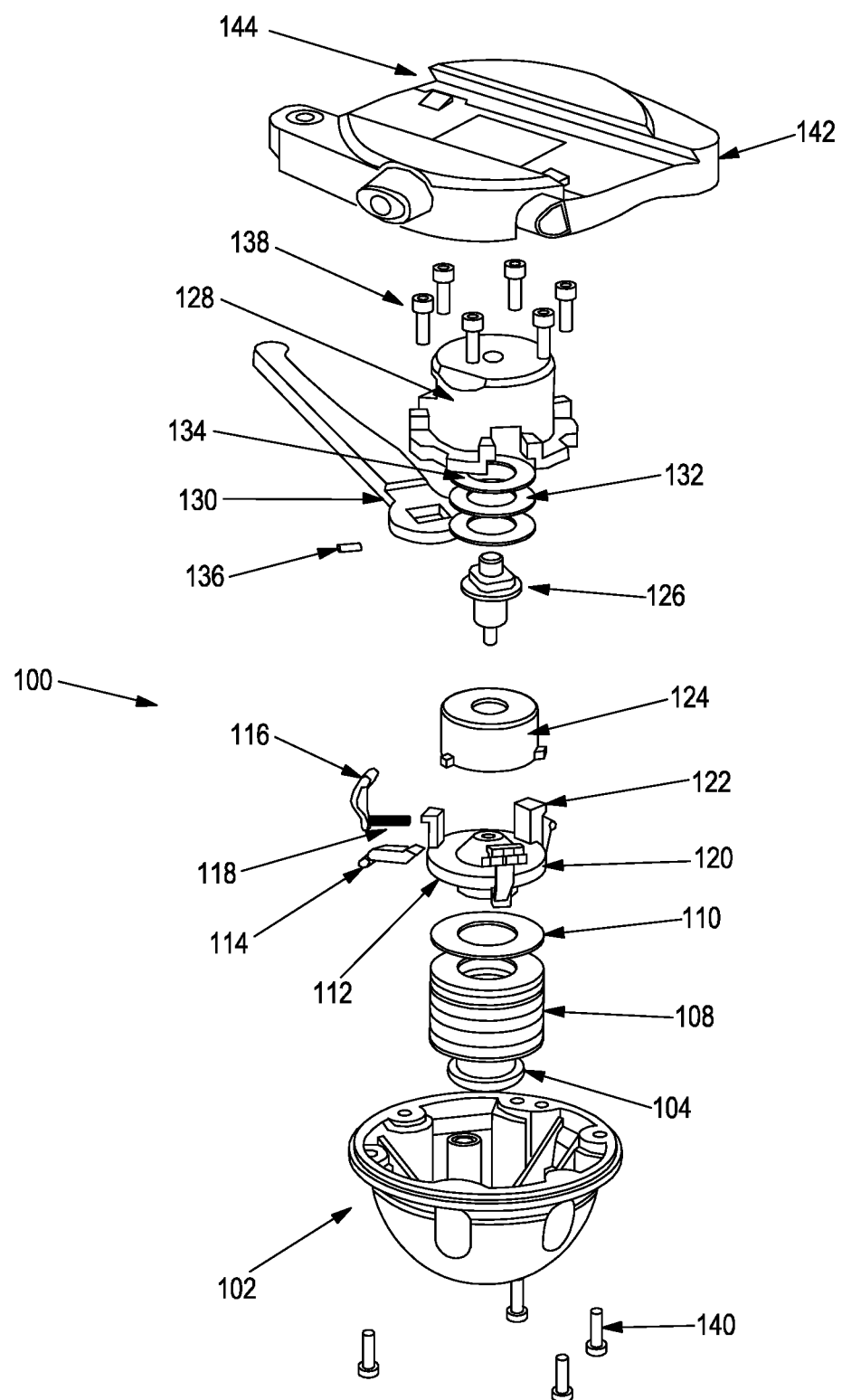
FIG. 1 shows an exploded perspective view of an exemplary head portion.

In FIG. 1, a head portion 100 is shown with at the bottom a bowl 102 with a flat bottom and a convex side profile, which together form an engagement surface of the head portion 100. Within the bowl 102 is arranged a bowl insert 104 which has an internal surface adapted to engage part of the clamp stud of the base portion (not shown in FIG. 1). The bowl insert 104 rests within an annular recess (not shown in FIG. 1) in the bowl 102. The bowl insert 104 has an annular flange which engages the recess and the lower end of a set of spring washers 108. At the upper end of the set of spring washers 108 is a spring edge contact ring 110, which in turn engages an annular flange of a spring compression plate 112. The spring compression plate 112 houses three stud catch plates 114 (not all shown or labelled). The stud catch plates 114 can move axially (horizontally) within a slot in the spring compression plate 112. An underside of the stud catch plates 114 is in contact with and supported by the contact ring 110. The axial movement of the stud catch plates 114 is actuated by corresponding stud release levers 116. The stud release levers 116 are urged by springs 118 so that the stud catch plates 114 are urged axially towards the centre of the head portion and thus towards the clamp stud when it is present in use. To enter the disengaged state, the stud catch plates 114 are moved axially away from the centre of the head portion and thus away from the clamp stud when it is present in use. The stud catch plates 114 have end portions with a sloped region, and are shaped to correspond with a recess in the clamp stud.

The spring compression plate 112 is part of a module 120 having substantially a disc portion which forms the spring compression plate 112, and having three spigots 122 upstanding therefrom equally spaced around the perimeter of the spring compression plate. The spigots 122 form a pivot for the stud release levers 116 so that the stud catch plates 114 can be moved thereby. The stud catch plates 114 move within slots formed with the module 120. The module 120 further has a frustoconical portion located above the spring compression plate 112, with a smaller diameter than the spring compression plate and spaced from the spigots 120 so that an annular flat portion is formed between the frustoconical portion and the spigots 120. The frustoconical portion of the module 120 engages with a correspondingly shaped portion of a lead screw nut 124, within which is arranged a lead screw shaft 126. The lead screw shaft 126 and lead screw nut 124 have a corresponding screw thread to enable the shaft 126 to rotate within the nut 124.

The lead screw shaft 126 has an upper portion of a wider diameter which forms a disc portion, and above that is a portion of approximately square cross section. At the top and bottom of the lead screw shaft 126 there are portions of reduced diameter, which are sized to fit into corresponding holes in the module 120 (at the bottom of the lead screw shaft 126) and a housing 128 (at the top of the lead screw shaft 126).

The housing 128 houses the lead screw shaft 126 and lead screw nut 124 above the module 120. The housing 128 also houses a portion of a levelling bar 130 which has a portion at one end with an approximately square aperture to engage the corresponding square cross section portion of the lead screw shaft 126. The levelling bar 130 has an elongate handle which extends away from the aperture. The housing 128 also houses a thrust bearing 132 and corresponding thrust bearing race 134. The thrust bearing 132 and thrust bearing race 134 facilitate rotation of the levelling bar 130 within the housing 128. The levelling bar 130 is held in place with respect to the lead screw shaft 126 by a screw 136.

The housing 128 is connected to the bowl 102 by a series of bolts 138.

Above the housing 128 and connected to the bowl 102 by a series of bolts 140 is a platform assembly 142. The platform assembly 142 has a recess or slot 144 formed within it, the slot having a wider portion towards the bottom and a narrower portion towards the top of the platform assembly 142, the slot 144 thus having a trapezoidal cross section. This arrangement of the slot 144 thus accommodates an item shaped correspondingly, so that the item can slide into and out of the slot horizontally along the length of the slot 144 but is held vertically within the slot 144.

Figure 2:
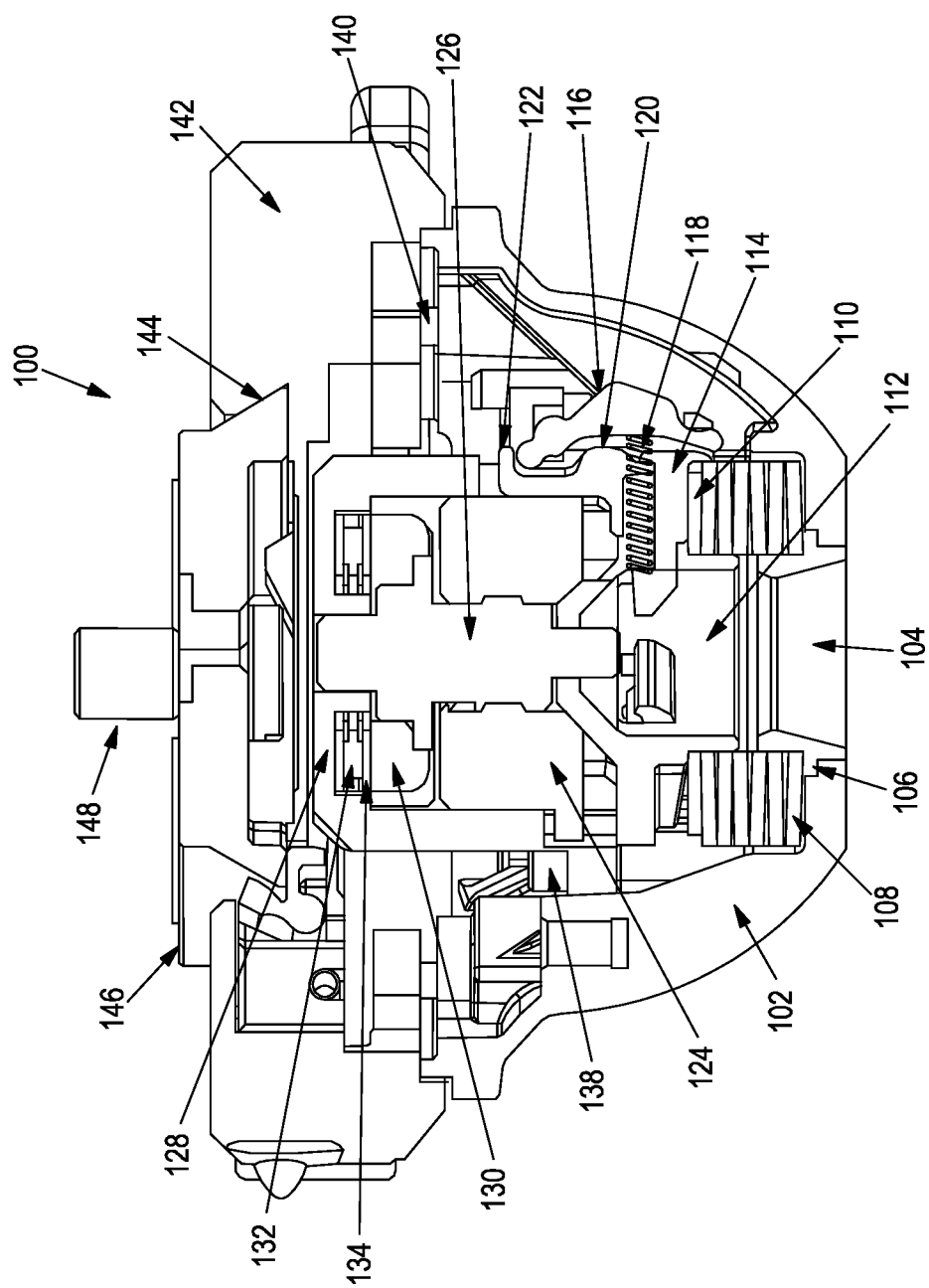
FIG. 2 shows a cross section of the same head portion as shown in FIG. 1.

In FIG. 2, the same head portion 100 is shown as in FIG. 1. In FIG. 2 it is more clearly shown that the bowl insert 104 rests within an annular recess 106 in the bowl 102. In this drawing a camera plate assembly 146 is shown within the slot 144. The camera plate assembly 146 has a screw-threaded bolt 148 extending upwards from it, the bolt intended for connecting to a further item or accessory.

Figure 4:
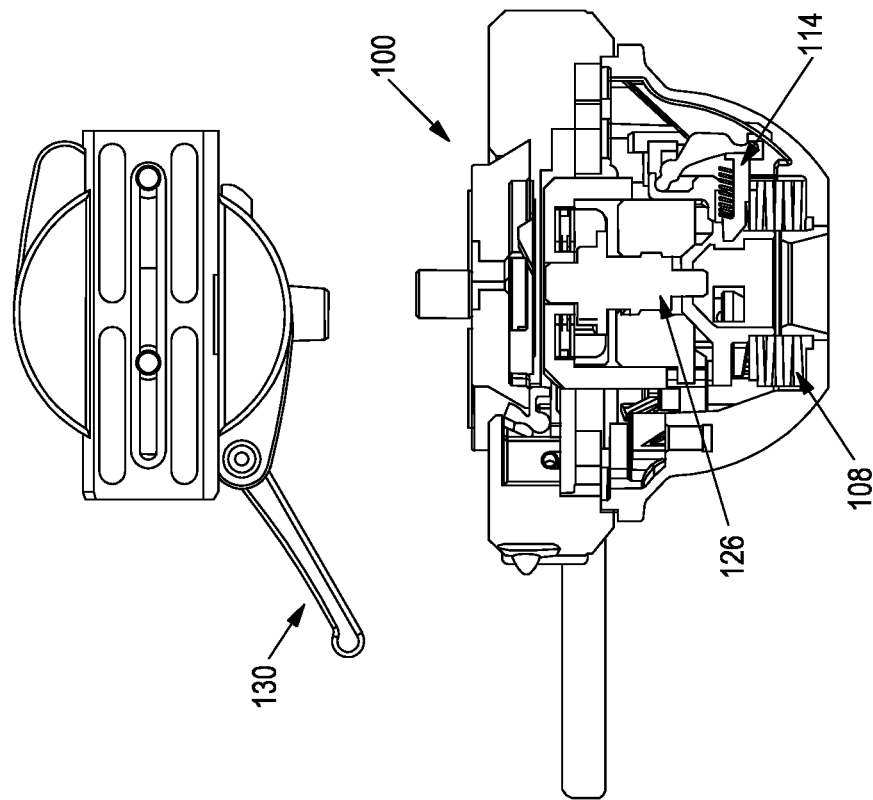
FIGS. 3 and 4 show the same head portion in an engaged and disengaged state, respectively.
Figure 3:
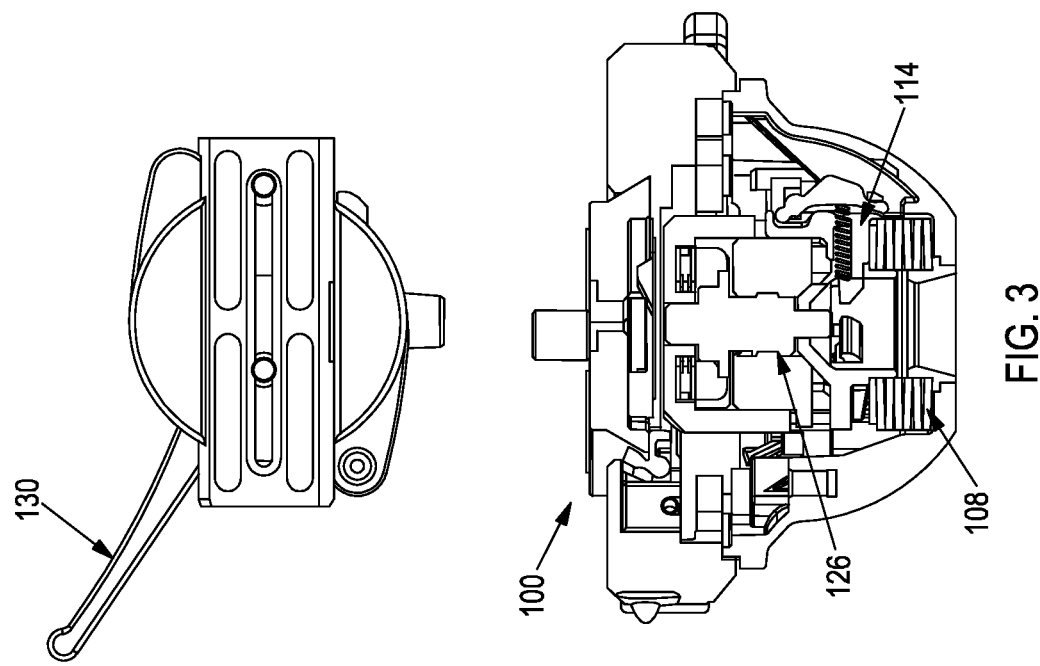

FIGS. 3 and 4 show the same head portion 100 as shown in FIGS. 1 and 2, with a camera plate assembly present in the slot, as in FIG. 2. These drawings show the head portion 100 from above (upper respective drawings) and in side cross section (lower respective drawings). Most of the features of the head portion 100 are not labelled in FIGS. 3 and 4, to aid the clarity of the drawings. In FIG. 3 the levelling bar 130 is in a first position and in FIG. 4 the levelling bar 130 is in a second position. In the first position of FIG. 3, the levelling bar 130 has effected the stud catch plates 114 towards the axis of the head portion 100 so as to engage a clamp stud in use. Furthermore the lead screw 126 is in a upper position so that no adjustment is possible. In contrast in FIG. 4 the position of the levelling bar 130 has effected the stud catch plates 114 away from the axis of the head portion 100 so as to disengage a clamp stud in use. Furthermore the lead screw 126 is in a lower position so that a levelling adjustment is possible. As seen in FIGS. 3 and 4, the spring washers 108 are more compressed in FIG. 4, when levelling adjustment is possible than in FIG. 3, when no adjustment is possible.

Figure 5:
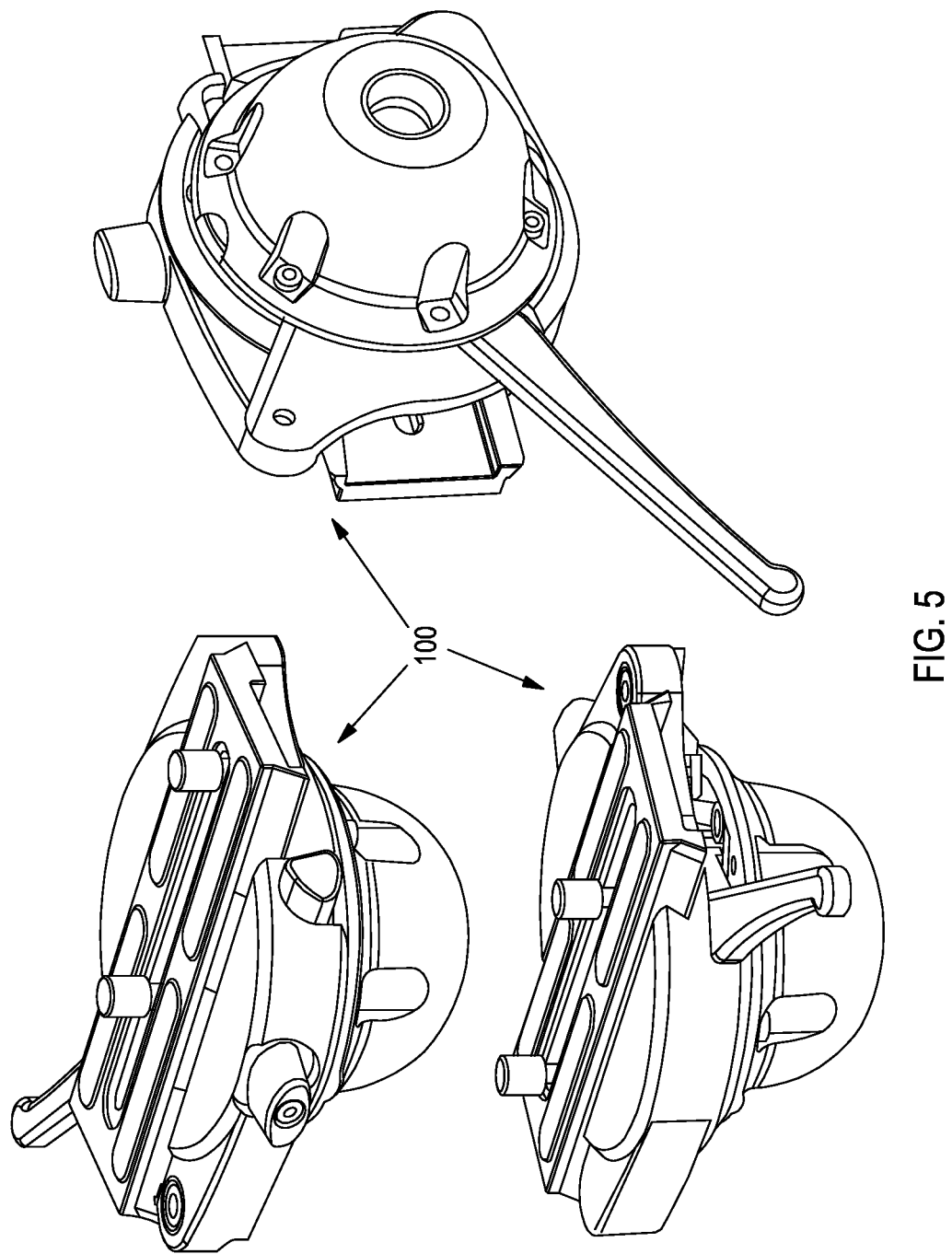
FIG. 5 shows the same head portion from different perspectives.

FIG. 5 shows the same head portion 100 as in FIGS. 1 to 4, from different perspectives. A camera plate assembly is present in the slot, as in FIGS. 2 to 4.

Figure 6:
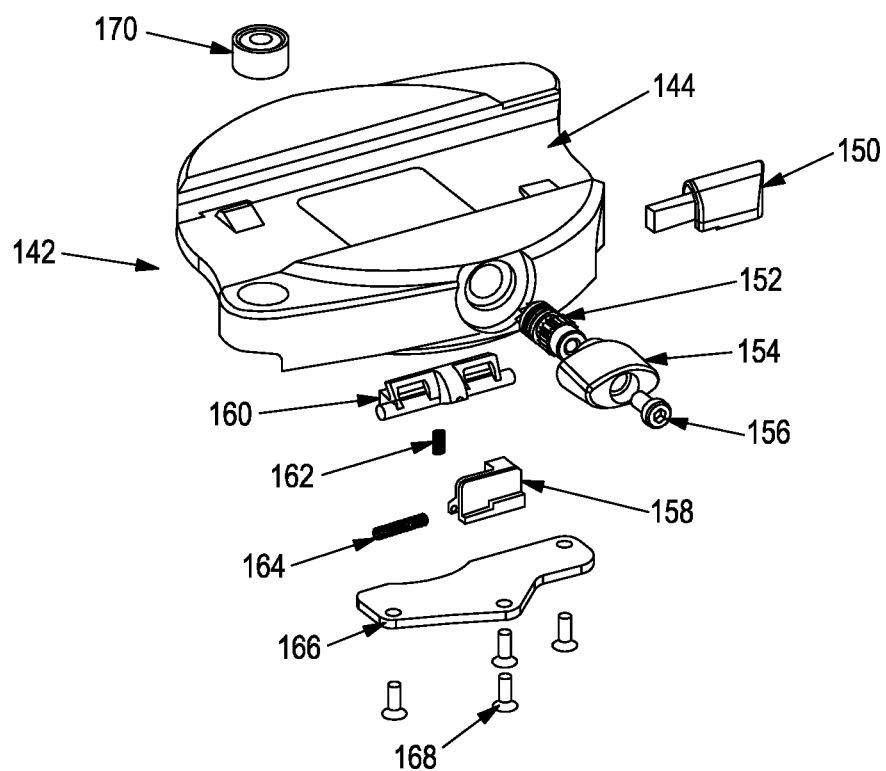
FIG. 6 shows an exploded perspective view of an exemplary platform assembly.

FIG. 6 shows an exploded perspective view of the platform assembly 142 as described above. The platform assembly 142 has a platform sideload slot 144 as described above. A sideload release button 150 enables or disables the release of an item within the slot 144. The platform assembly 142 has further features as shown in FIG. 6, namely a clamp shaft 152, a clamp knob 154 with a screw 156, a lock 158, a clamp 160, springs 162 and 164, a mechanism cover unit 166 which is affixed by screws 168. The platform assembly unit 142 has a bubble level 170 arranged therein.

Figure 7:
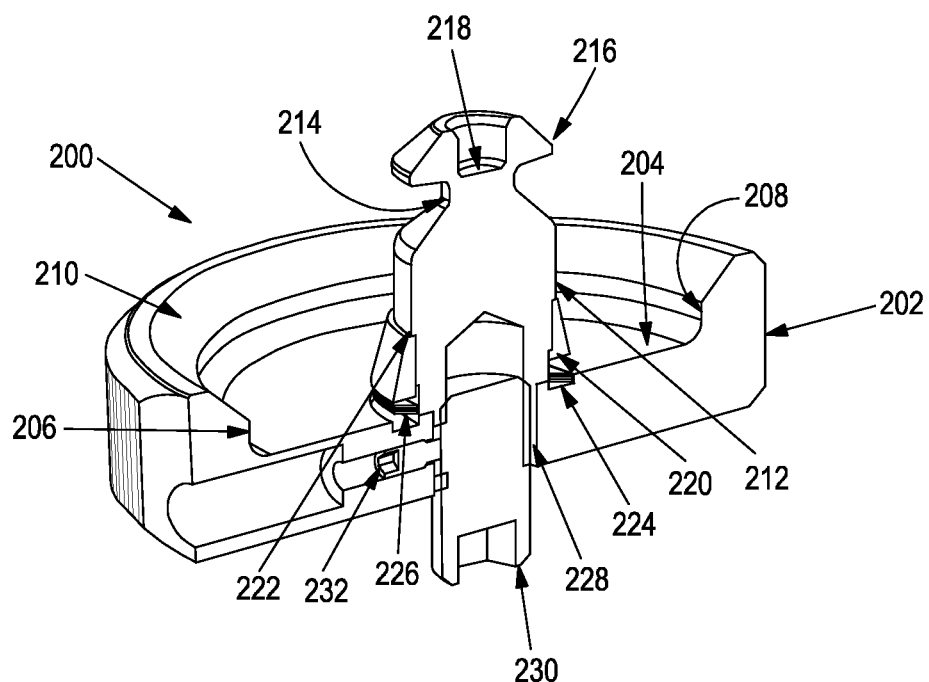
FIG. 7 shows a cross section of an exemplary base portion.

FIG. 7 shows a perspective cross section of an exemplary base portion 200 of the present inventive concept. The base portion 200 has circular main body 202 which has a flat base 204 and a bowl-shaped inner surface 206, with regions of substantially vertically wall 208 and sloped wall 210. Upstanding from the flat base 204 is a clamp stud 212 which has a recess 214 along its length and a bulbous end portion 216. The recess 214 in use is shaped to correspond with the stud catch plates of the head portion (not shown). Within the bulbous end portion 216 is a recess 218 sized to accommodate a portion of the lead screw of the head portion (not shown). Towards the lower end of the clamp stud 212 a wedge collar 220 surrounds the clamp stud 212. The wedge collar 220 is held against the clamp stud 212 by an engagement portion 222 of the clamp stud 212. An annular recess 224 in the flat base 204 of the base portion 200 accommodates a wave spring 226 which urges the wedge collar 220 against the engagement portion 220 of the clamp stud 212.

The base portion 200 has an aperture 228 formed in its underside which has a screw-thread matching that of a screw-threaded bolt 230 which may be part of a further item. The bolt 230 can be fixed by a grub screw 232.

Figure 8:
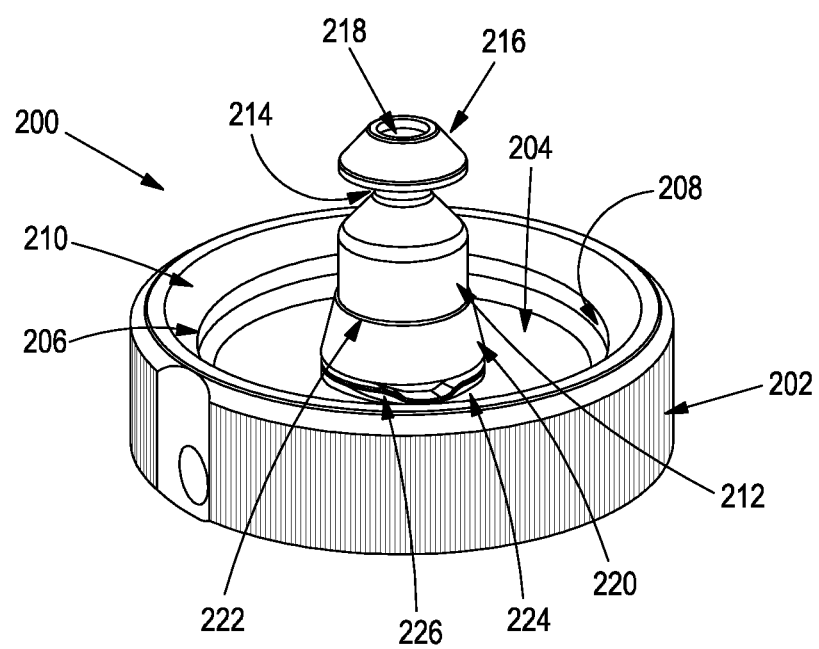
FIG. 8 shows a perspective view of the same base portion.

FIG. 8 shows a perspective view of the base portion 200 shown in FIG. 7. Where shown in FIG. 8, the elements are labelled as in FIG. 7.

The invention claimed is:

1. A releasable connection arrangement, suitable for releasably connecting two items, wherein a base portion comprises a clamp stud and a head portion comprises a stud catch mechanism, and wherein the clamp stud and stud catch mechanism are adapted to be connected to one another when the stud catch mechanism is in an engaged state and to be not connected to one another when the stud catch mechanism is in a disengaged state, the stud catch mechanism providing a substantially frictional connection between the stud catch mechanism and the clamp stud when the stud catch mechanism is in the engaged state, the stud catch mechanism comprising a stud catch plate adapted to be moveable axially and a stud release lever adapted to move the stud catch plate axially towards and away from the clamp stud in use, so that the stud catch plate can engage and disengage the clamp stud in use, and wherein the base portion and head portion each further comprise engagement surfaces shaped to correspond with one another, the engagement surface of the base portion comprising a substantially flat region and a concave region and the engagement surface of the head portion comprising a substantially flat region and a convex region, and wherein the head portion further comprises an adjustment mechanism adapted to adjust the connection between the head portion and the base portion when the base and head portions are connected to one another, and wherein the head portion further comprises a platform assembly located away from the engagement surface, the platform assembly is configured to attach to another item.

2. The releasable connection arrangement according to claim 1, wherein the engagement surface of the head portion forms a bowl-type shape with a flat base and the engagement surface of the base portion thus forms a corresponding bowl-type shape with a flat base.

3. The releasable connection arrangement according to claim 1, wherein the head portion comprises a lead screw arranged substantially vertically along a central axis thereof and above a spring compression plate, a downwardly facing surface of the lead screw being adapted to engage an upwardly facing surface of the spring compression plate.

4. The releasable connection arrangement according to claim 2, wherein the head portion comprises a lead screw arranged substantially vertically along a central axis thereof and above a spring compression plate, a downwardly facing surface of the lead screw being adapted to engage an upwardly facing surface of the spring compression plate.

* * * * *